United States Patent [19]

Kimura et al.

[11] Patent Number: 5,440,729
[45] Date of Patent: Aug. 8, 1995

[54] METHOD FOR HANDLING ERROR INFORMATION BETWEEN CHANNEL UNIT AND CENTRAL COMPUTER

[75] Inventors: Toshio Kimura; Tatsuhiko Tanimichi, both of Tokyo, Japan

[73] Assignee: NEC Corporation, Tokyo, Japan

[21] Appl. No.: 353,373

[22] Filed: Dec. 2, 1994

Related U.S. Application Data

[63] Continuation of Ser. No. 686,625, Apr. 18, 1991.

[30] Foreign Application Priority Data

Apr. 18, 1990 [JP]  Japan .................................. 2-102279

[51] Int. Cl.⁶ ............................................. G06F 11/00
[52] U.S. Cl. .................. 395/182.07; 371/48; 395/839; 395/183.19; 395/185.19
[58] Field of Search ................ 395/575; 371/12, 47.1, 371/48; 364/265, 265.2

[56] References Cited

U.S. PATENT DOCUMENTS

| | | |
|---|---|---|
| 3,784,801 | 1/1974 | Caputo et al. ........................ 371/12 |
| 3,805,038 | 4/1974 | Buedel et al. . | |
| 4,564,899 | 1/1986 | Holly et al. ......................... 364/200 |
| 4,745,602 | 5/1988 | Morrell ................. 371/12 |
| 4,912,707 | 3/1990 | Kogge et al. ........... 371/12 |
| 5,056,091 | 10/1991 | Hunt ....................... 371/12 |
| 5,093,910 | 3/1992 | Tulpule et al. ............ 395/575 |

*Primary Examiner*—Robert W. Beausoliel, Jr.
*Assistant Examiner*—Albert Décady
*Attorney, Agent, or Firm*—Foley & Lardner

[57] ABSTRACT

A channel unit is provided between a central computer and a peripheral and includes a plurality of registers for data transfer therebetween. In the event that an error occurs in one of the registers, a processor provided in the channel unit terminates a normal data transfer operation and freezes all the registers. A content of each of the freezed registers is stored, as the error information, into a memory which is provided in the channel unit. The central computer is advised of the error occurrence and issues a reset signal which releases the freezing of the registers. The channel unit receives an instruction, from the central computer, for transferring the error information stored in the memory. The error information stored in the memory is transferred to the central computer, via a data channel, in response to the instruction applied.

12 Claims, 2 Drawing Sheets

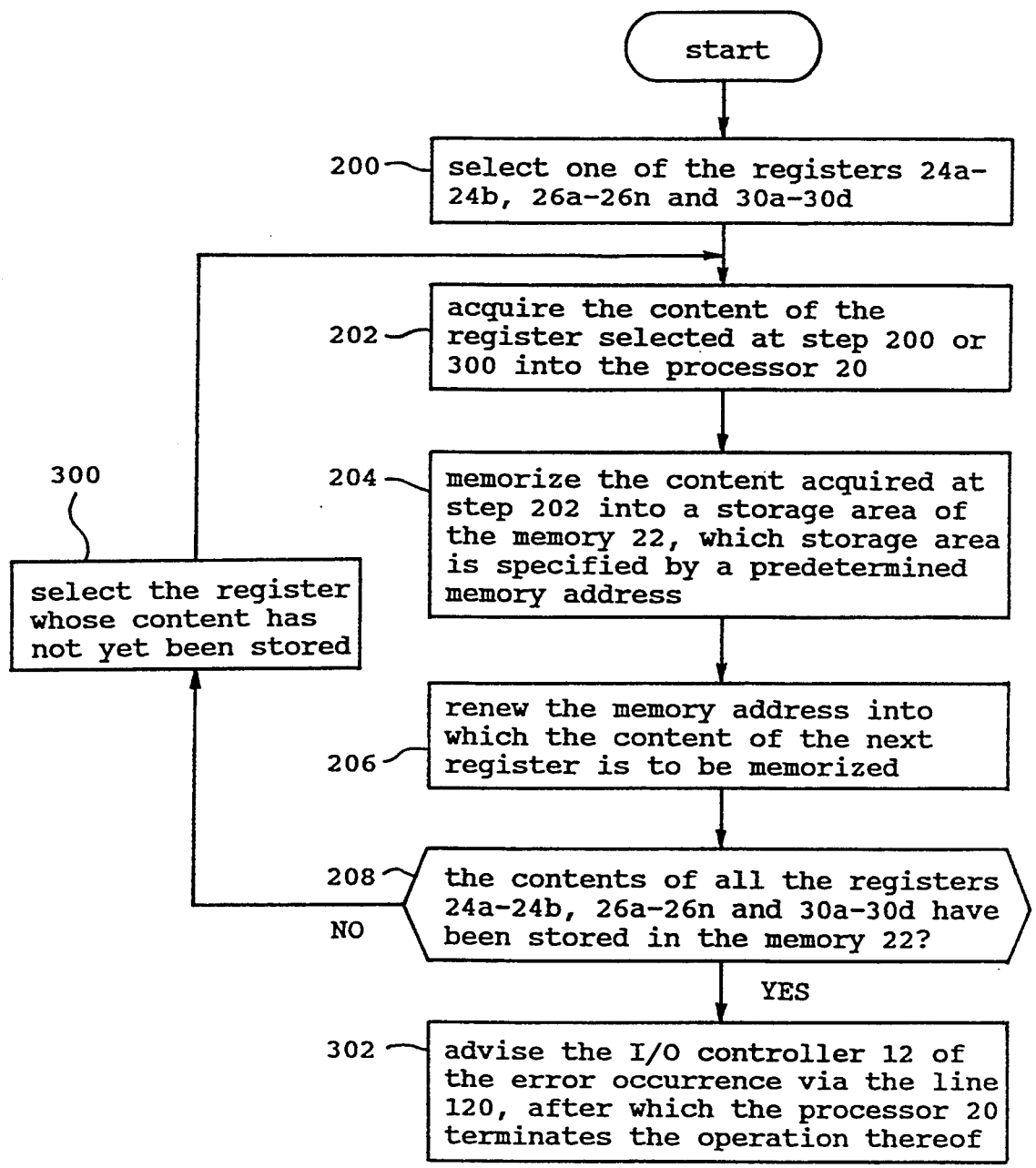

METHOD FOR HANDLING ERROR INFORMATION BETWEEN CHANNEL UNIT AND CENTRAL COMPUTER

This application is a continuation, of application Ser. No. 07/686,625, filed Apr. 18, 1991, now abandoned.

BACKGROUND OF THE INVENTION

1. Field of the Invention

The present invention relates generally to a method for handling error information between a channel unit and a central computer. The channel unit is arranged between the central computer and a peripheral. More specifically, the present invention relates to a method for acquiring error information when a malfunction occurs in a channel unit and for transferring the acquired error information to the central computer via a data bus.

2. Description of the Prior Art

Plural channel units are provided between an input/output (I/O) controller forming part of a central computer and the corresponding peripherals (I/O devices). Each of the channel units carries out buffering (for example) for gathering data at a time when it is not needed so that the data will be available for processing when it is needed.

When a hardware and/or software malfunction is detected within one of plural channel units, it is necessary for the central computer to obtain the error information from the troubled channel unit for error diagnostics.

According to a known technique, in the event that an error is detected within one of the channel units, the I/O controller brings the channel unit into a freeze mode, after which error information is acquired and then transferred to the I/O controller by way of a dedicated channel to the error diagnostics (viz., a scan-channel).

However, in order to transfer the error information to the I/O controller through the scan-channel, it is required that the I/O controller switches the data transfer clocks to the clocks dedicated to the scan-channel. Accordingly, the prior art technique has encountered the problem in that the operation of all of the channel units coupled to the I/O controller must be temporarily stopped during the time duration from the error information transfer to the I/O controller to the completion thereof. In other words, the normal data transfers between the central processor and all the peripherals, are undesirably discontinued for the above-mentioned period of time.

SUMMARY OF THE INVENTION

It is therefore an object of the present invention to provide a method which eliminates the need for terminating the operation of each of the channel units except for the channel unit wherein an error is detected.

In brief, the above object is achieved by a method for transferring error information from a channel unit to a central computer. The channel unit is provided between the central computer and a peripheral and includes a plurality of registers for data transfer therebetween. In the event that an error occurs in one of the registers, a processor provided in the channel unit terminates a normal data transfer operation and freezes all the registers. A content of each of the freezed registers is stored, as the error information, into a memory which is provided in the channel unit. The central computer is advised of the error occurrence and issues a reset signal which releases the freezing of the registers. The channel unit receives an instruction, from the central computer, for transferring the error information stored in the memory. The error information stored in the memory is transferred to the central computer, via a data channel, in response to the instruction applied.

More specifically a first aspect of the present invention is deemed to come in a method for transferring error information from a channel unit to a central computer in the event that an error occurs in the channel unit, the channel unit being provided between the central computer and the peripheral and including a plurality of registers for transferring data therebetween, the method comprising the steps of: (a) detecting an error which occurred in one of the registers, by a processor provided in the channel unit; (b) interrupting a data transfer operation of the processor in response to the detection of the error and bringing the registers into a freezing mode; (c) acquiring a content of each of the registers, as the error information, into a memory means provided in the channel unit, and advising the error occurrence of the central computer; (d) receiving a reset signal from the central computer and releasing the freezing mode; (e) receiving an instruction, from the central computer, for transferring the error information stored in the memory means; and (f) transferring the error information stored in the memory means to the central computer, via a data channel, in response to the instruction applied at step (e).

A second aspect of the present invention is deemed to come in a method for transferring error information from a channel unit to a central computer in the event that an error occurs in the channel unit, the channel unit being provided between the central computer and the peripheral and including a plurality of registers for transferring data therebetween, the method comprising the steps of: (a) issuing an interrupt signal in the event that an error occurs in one of the registers; (b) applying the interrupt signal to a processor provided in the channel unit; (c) interrupting a data transfer operation of the processor in response to the application of the interrupt signal to the processor; (d) bringing the registers into a freezing mode; (e) acquiring a content of each of the registers, as the error information, into a memory means provided in the channel unit; (f) advising the error occurrence of the central computer; (g) receiving a reset signal from the central computer and releasing the freezing mode; (h) receiving an instruction, from the central computer, for transferring the error information stored in the memory means; and (i) transferring the error information stored in the memory means to the central computer, via a data channel, in response to the instruction applied at step (h).

BRIEF DESCRIPTION OF THE DRAWINGS

The features and advantages of the present invention will become more clearly appreciated from the following description taken in conjunction with the accompanying drawings in which:

FIG. 2 is a flow chart depicting the operation which characterizes the operation of the present invention.

DETAILED DESCRIPTION OF THE PREFERRED EMBODIMENTS

Figure 1:
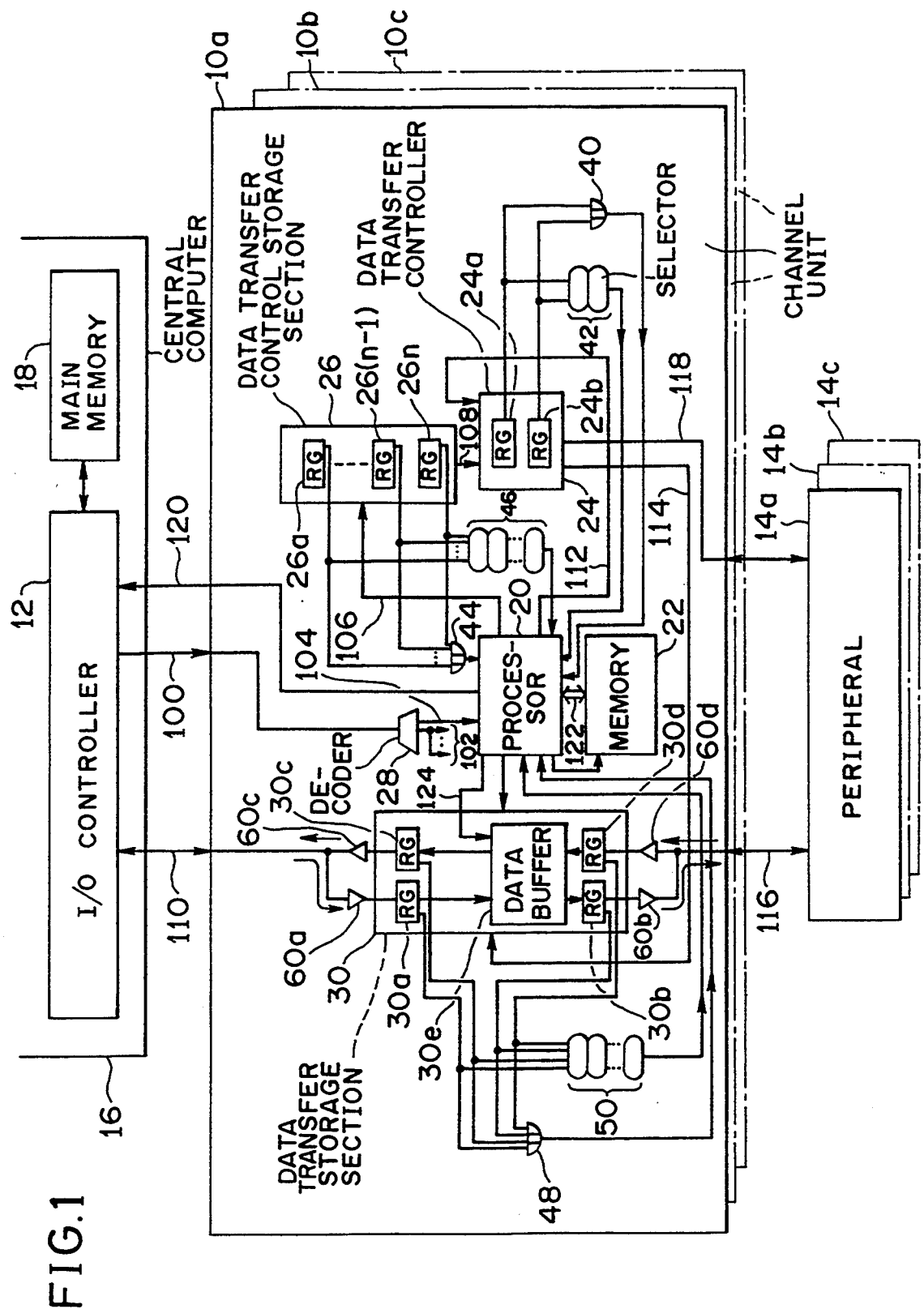
FIG. 1 is a block diagram showing an example of a hardware arrangement which embodies the present invention.

Reference is now made to FIG. 1, wherein there is shown a plurality of channel units 10a, 10b and 10c each of which functions as a buffer. The channel units 10a, 10b and 10c are configured in exactly the same manner with one another.

As shown, the channel unit 10a is coupled between an I/O controller 12 and a peripheral 14a. The unit 10b is provided between the I/O controller 12 and a peripheral 14b. Similarly, the unit 10c is provided between the controller 12 and a peripheral 14c. It should be noted that the physical connections between the controller 12, the channel units 10b, 10c and the peripherals 14b, 14c are omitted for the sake of simplifying the drawing. The controller 12 forms part of a central computer 16 which includes a main memory 18. Although not shown in FIG. 1, a central processing unit (CPU) is provided in the central computer 16 for controlling the overall system illustrated. The present invention will be described with the channel unit 10a, the discussion of which is applicable to each of the other channel units 10b, 10c.

The channel unit 10a is generally comprised of a processor 20, a memory 22, a data transfer controller 24, a data transfer control storage section 26, a decoder 28, a data transfer storage section 30, etc. The data transfer controller 24 includes two registers 24a, 24b in this particular embodiment, while the storage section 26 includes a plurality of registers 26a–26n. On the other hand, the data transfer storage section 30 includes a plurality of registers 30a–30d, and a data buffer 30e.

The arrangement shown in FIG. 1 further includes:

(a) an OR gate 40 and a selector 42, each of which is coupled between the processor 20 and the registers 24a–24b;

(b) an OR gate 44 and a selector 46, each of which is provided between the processor 20 and the registers 26a–26n;

(c) an OR gate 48 and a selector 50, each of which is coupled between the processor 20 and the registers 30a–30d; and (d) two receivers 60a, 60d and two drivers 60b, 60c for transferring data from the I/O controller 12 to the peripheral 14a and vice versa as indicated by solid arrows (no numerals).

The operation of the instant embodiment will be discussed with reference to FIGS. 1 and 2.

Prior to the beginning of the data transfer between the I/O controller 12 and peripheral 14a via the channel unit 10a, the controller 12 issues a reset signal which is applied to the decoder 28 via a line 100. The decoder 28 translates the encoded reset signal back to its original form, and then resets, via lines 102, the registers 24a–24b, 26a–26n, 30a–30d and the data buffer 30e. The processor 20 is also supplied with the decoded reset signal via a line 104 and, after the above-mentioned resetting of the registers, transfers or relocates a plurality of data transfer control instructions (viz., write and read instruction, etc.) previously stored in the memory 22 to the corresponding registers 26a–26n using lines 122 and 106.

It is assumed for the sake of explanation that the I/O controller 12 wishes to transfer data to the peripheral 14a. The controller 12 issues a data write instruction which is fed to the processor 20 by way of the line 100 and the decoder 28. The processor 20, in response to the data write instruction applied thereto, moves the data write control instructions stored in the section 26 to the corresponding register (24a or 24b) of the section 24 via a line 108.

Following this, the I/O controller 12 supplies the data buffer 30e with the data to be written into the peripheral 14a via a data line 110 and the receiver 60a and the register 30a. When the data buffer 30e stores a predetermined amount of data, the processor 20 activates the data transfer controller 24 via a line 112. The controller 24 instructs, using the write control instructions previously stored therein, the section 30 to transfer the data within the buffer 30e to the peripheral 14a. The instruction is made via a line 114. Thus, the data stored in the data buffer 30e are written into the peripheral 10a via the driver 60b and a line 116. At the same time, the data transfer controller 24 applies the data write instructions to the peripheral 14a via a line 118.

Data transfer from the peripheral 14a to the I/O controller 12 of the central computer 16 is implemented in the manner similar to the above-mentioned operation, in the case of which the receiver 60d and the driver 60c are utilized. The normal data transfer via the channel unit 14a is not directly concerned with the present invention and hence further description thereof will be omitted for brevity.

It is assumed that a parity check error (for example) has occurred within one of the registers 26a–26n of the section 26, then an error signal (viz., interrupt signal) is applied to the processor 20 through the OR gate 44. The processor 20, in response to the interrupt signal applied, freezes all of the registers 24a–24b and 26a–26n and 30a–30d, the data buffer 30e and the memory 22. More specifically, in the freeze mode, the value within each of the above-mentioned storage means (viz., registers 24a–24b, . . . , and 22) is held as it was when the interrupt occurred. Following this, the processor 20 terminates the normal operations in response to the interrupt signal, and then executes a microprogram which is previously stored in the memory 22 and which includes the operation steps shown in FIG. 2 in order to sequentially store the contents of all the registers 24a–24b, 26a–26n and 30a–30d. That is to say, Step 200: select one of the registers 24a–24b, 26a–26n and 30a–30d;

Step 202: acquire the content of the register selected at step 200 or 300 into the processor 20 using the selector 42, 46 or 50;

Step 204: memorize the content acquired at step 202 into a storage area of the memory 22, which storage area is specified by a predetermined memory address;

Step 206: renew the memory address into which the content of the next register is to be memorized;

Step 208: check to see if the contents of all the registers have been stored in the memory 22 and, if the memory 22 has not yet stored the contents of all the registers then the program goes to step 300 and, otherwise, the program goes to step 302;

Step 300: a register is selected whose content has not yet been stored and go to step 202; and Step 302: the processor 20 advises the I/O controller 12 of the error occurrence via the line 120, after which the processor 20 terminates the operation thereof. In this case, the processor 20 is only able to respond to an error information transfer instruction applied via the lines 100, 104 from the I/O controller 12.

After the I/O controller 12 is advised by the processor 20 that the error has occurred in the channel unit 10a, the controller 12 issues a reset signal. This reset signal is applied, through the decoder 28 and the lines 102, to the registers (24a–24b, 26a–26n, 30a–30d) and the data buffer 30e thereby to initialize same. Following this, the controller 12 instructs the processor 20 to transfer the error information, viz., the contents of the registers (24a–24b, 26a–26n, 36a–36d) stored in the memory 22. The processor 20 moves the data transfer instructions previously stored in the memory 22 into the section 26, after which the data control section 24 receives the data transfer instructions from the section 26, as in the normal data transfer. Following this, the processor 20 relocates the error information held in the memory 22 to the data buffer 30e via lines 122 and 124, after which the processor 20 instructs the data transfer controller 24 to transfer the error information to the I/O controller 12 via the register 30c, the driver 60c and the line 110.

In the foregoing, it has been assumed that an error has occurred in one of the registers 26a–26n of the section 26. However, it is clear that the same discussion is applicable to the other cases where an error occurs in the registers of the section 24 or 30.

While the foregoing description describes only one embodiment of the present invention, the various alternatives and modifications possible without departing from the scope of the present invention, which is limited only by the appended claims, will be apparent to those skilled in the art.

What is claimed is:

1. A method for transferring error information from one of a plurality of channel units to a central computer if an error occurs in said one of said channel units, said channel units being provided between said central computer and a plurality of respective peripherals and each of said channel units including a plurality of registers for transferring data therebetween via a respective data channel, said method comprising the steps of:
    (a) detecting said error which occurred in one of the registers, by a processor provided in said one of said channel units;
    (b) interrupting a data transfer operation of said processor in response to the detection of the error and bringing the registers into a freezing mode, thereby rendering said one of said channel units temporarily inoperative without rendering an other channel units inoperative;
    (c) acquiring a content of each of the registers, as the error information, into a memory means provided in said one of said channel units, and advising the central computer of the error occurrence;
    (d) receiving a first reset signal in said one of said channel units from the central computer and releasing the freezing mode;
    (e) receiving an instruction in said one of said channel units, from said central computer, for transferring the error information stored in said memory means;
    (f) transferring the error information stored in said memory means to the central computer, via said respective data channel, in response to the instruction received at step (e); and
    (g) receiving a second reset signal in said one of said channel units from said central computer at said one of said channel units and rendering said one of said channel units operative in a normal data transfer mode.

2. A method as claimed in claim 1, further comprising the step of:
    moving the error information into a data transfer section for use in the data transfer operation before step (f).

3. A method as claimed in claim 2, wherein said data transfer section includes a data buffer into which the error information is stored.

4. A method for transferring error information from one of a plurality of channel units to a central computer if an error occurs in said one of said channel units, said channel units being provided between said central computer and a plurality of respective peripherals and each of said channel units including a plurality of registers for transferring data therebetween via a respective data channel, said method comprising the steps of:
    (a) issuing an interrupt signal if said error occurs in one of the registers of said one of said channel units;
    (b) applying said interrupt signal to a processor provided in said one of said channel units;
    (c) interrupting a data transfer operation of said processor in response to an application of said interrupt signal to said processor;
    (d) bringing the registers into a freezing mode, thereby rendering said one of said channel units temporarily inoperative without rendering the other channel units inoperative;
    (e) acquiring a content of each of the registers, as an error information, into a memory means provided in said one of said channel units;
    (f) advising the central computer of an error occurrence;
    (g) receiving a first reset signal in said one of said channel units from the central computer and releasing the freezing mode;
    (h) receiving an instruction in said one of said channel units, from said central computer, for transferring the error information stored in said memory means;
    (i) transferring the error information stored in said memory means to the central computer, via said respective data channel, in response to the instruction received at step (h); and
    (j) receiving a second reset signal in said one of said channel units from the central computer at said one of said channel units and rendering said one of said channel units operative in a normal data transfer mode.

5. A method as claimed in claim 4, further comprising the step of:
    moving the error information into a data transfer section for use in a data transfer operation before step (a).

6. A method as claimed in claim 5, wherein said data transfer section includes a data buffer into which the error information is stored.

7. An apparatus for transferring error information to a central computer if an error is detected, said apparatus being provided as one of a plurality of apparatuses between said central computer and a respective plurality of peripherals for transferring data therebetween via a respective data channel, said apparatus comprising:
    (a) a plurality of registers;
    (b) a processor detecting said error which occurred in one of the registers;
    (c) means for interrupting a data transfer operation of said processor in response to the detection of the error, and bringing the registers into a freezing mode, thereby rendering the apparatus temporarily inoperative without rendering the other apparatuses inoperative;

(d) memory means for acquiring a content of each of the registers, as an error information, and advising the central computer of the error occurrence;

(e) means for receiving a first reset signal from the central computer, and for transferring the error information stored in said memory means;

(f) means for receiving an instruction, from said central computer, for transferring the error information stored in said memory means;

(g) means for transferring the error information stored in said memory means to the central computer, via said respective data channel, in response to the instruction; and (h) means for receiving a second reset signal and for rendering said apparatus operative in a normal data transfer mode in response to a second reset signal applied from said central computer.

8. An apparatus as claimed in claim 7, further comprising a data transfer section and means for moving the error information into said data transfer section for use in a data transfer operation.

9. An apparatus as claimed in claim 8, wherein said data transfer section includes a data buffer into which the error information is stored.

10. An apparatus for transferring error information to a central computer if an error occurs, said apparatus being provided as one of a plurality of apparatuses between said central computer and a respective plurality of peripherals for transferring data therebetween via a respective data channel, said apparatus comprising:

(a) a plurality of registers;

(b) means for issuing an interrupt signal if said error occurs in one of the registers;

(c) means for applying said interrupt signal to a processor, thereby rendering the apparatus temporarily inoperative without rendering the other apparatuses inoperative;

(d) means for interrupting a data transfer operation of said processor in response to an application of said interrupt signal to said processor;

(e) means for bringing the registers into a freezing mode;

(f) memory means for acquiring a content of each of the registers, as an error information;

(g) means for advising the central computer of the error occurrence;

(h) means for receiving a first reset signal from the central computer and releasing the freezing mode;

(i) means for receiving an instruction, from said central computer, for transferring the error information stored in said memory means;

(j) means for transferring the error information stored in the memory means to the central computer, via said respective data channel, in response to the instruction; and (k) means for receiving a second reset signal from the central computer and rendering said apparatus operative in a normal data transfer mode.

11. An apparatus as claimed in claim 10, further comprising a data transfer section and means for moving the error information into a data transfer section for use in a data transfer operation.

12. An apparatus as claimed in claim 11, wherein said data transfer section includes a data buffer into which the error information is stored.

* * * * *